INVENTOR.
William Blau

INVENTOR.
William Blau

INVENTOR.
William Blau
BY
ATTORNEY.

United States Patent Office 3,374,478
Patented Mar. 19, 1968

3,374,478
RADAR SIGNALING SYSTEM WITH
REDUCED CLUTTER EFFECT
William Blau, Haddonfield, N.J., assignor of one-half to
Spectronics, Inc., a corporation of New Jersey
Filed Dec. 7, 1966, Ser. No. 599,754
17 Claims. (Cl. 343—5)

ABSTRACT OF THE DISCLOSURE

A radar system is provided having improved characteristics with respect to clutter effects. The radar transmitter supplies spaced frequency bands of substantially identical signals. The radar receiver spectrally correlates the returned signals to provide auto-correlation of true target signals and substantial cross-correlation of clutter signals. By means of spaced sub-bands a wide transmission bandwidth may be provided as well as a narrow correlated band that is suitable for processing.

---

This invention relates to radar signaling systems, and particularly to radar systems having improved characteristics with respect to clutter effects.

In radar systems "clutter" is associated with the signals produced from an area in the radar line-of-sight and apparently surrounding the target itself. The target, relatively, may be considered to be in the nature of a point. The clutter signals are those produced by large bodies such as the sea, rain, mountains, extended terrain, etc., upon which the true target signal is superimposed. Effective radar operation may depend upon discrimination between the target and the clutter signals. Clutter as an external "noise" source and the relations of clutter and receiver noise are discussed in the literature, for example, in the book, "Threshold Signals" by Lawson et al., chaps. 6 and 11, Dover Publications, 1965 (McGraw-Hill, 1950). It has been known, and measurements show, that a large bandwidth in the radar transmission tends to provide a reduction in clutter signals; however, information signals having a large bandwidth cannot ordinarily be processed in a practical fashion. A survey of clutter reduction techniques is presented in "Introduction to Radar Systems" by Skolnick, chaps. 4 and 12, McGraw-Hill, 1962, which summarizes and references various publications thereon, which are of interest as background for this invention. Additional background for this invention is my article, "Radar Partial Coherence Theory: An Introduction"— AIEEE Trans. Aerospace & Electronic Systems, vol. AES-2, No. 3, September 1966, p. 536.

Accordingly, it is among the objects of this invention to provide a new and improved radar signaling system in which clutter effects are substantially reduced.

Another object is to provide a new and improved radar system in which the transmitted bandwidth is large and the signals for processing have a narrow bandwidth.

In accordance with an embodiment of this invention, a radar system comprises a transmitter arranged for transmitting signals about a plurality of spaced frequencies. The signals are generally transmitted in spaced frequency bands, and the signals in the spaced bands are substantially similar in modulation and other characteristics. The radar receiver includes means for separately handling amplitude-phase characteristics of the reflected signals in the spaced frequency bands, and means for spectrally correlating the returned signals.

The spectral correlation means, in one form of the invention, includes means for instantaneously multiplying the amplitude-phase relations of the returned signals in spaced frequency bands corresponding to the transmitted frequency bands, and means for utilizing the product signals in a band about a frequency corresponding to the difference between the frequency bands of the multiplied signals. The spectral correlation of the spaced signal bands generally tends to provide auto-correlation of true target signals and substantial cross-correlation of the clutter signals, whereby clutter signals tend to be substantially reduced. In various forms of the invention, the transmitted bandwidth can be chosen to be quite large, and the bandwidth at the difference frequency can be relatively narrow for processing.

The foregoing and other objects of this invention, the various features thereof, as well as the invention itself, may be more fully understood from the following description when read together with the accompanying drawing, in which.

Figure 1:
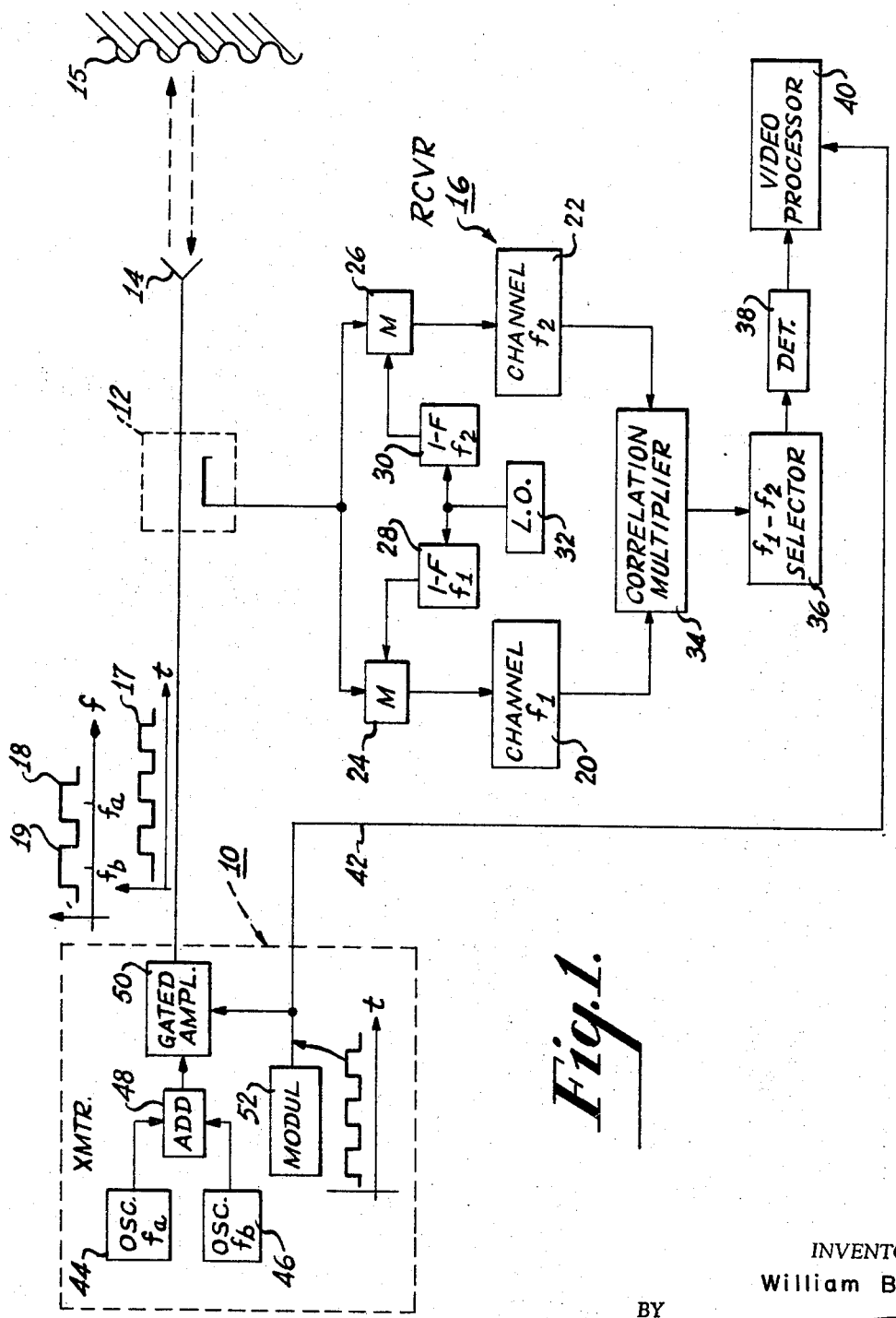
FIGURE 1 is a schematic block diagram of a radar system embodying this invention.
Figure 4:
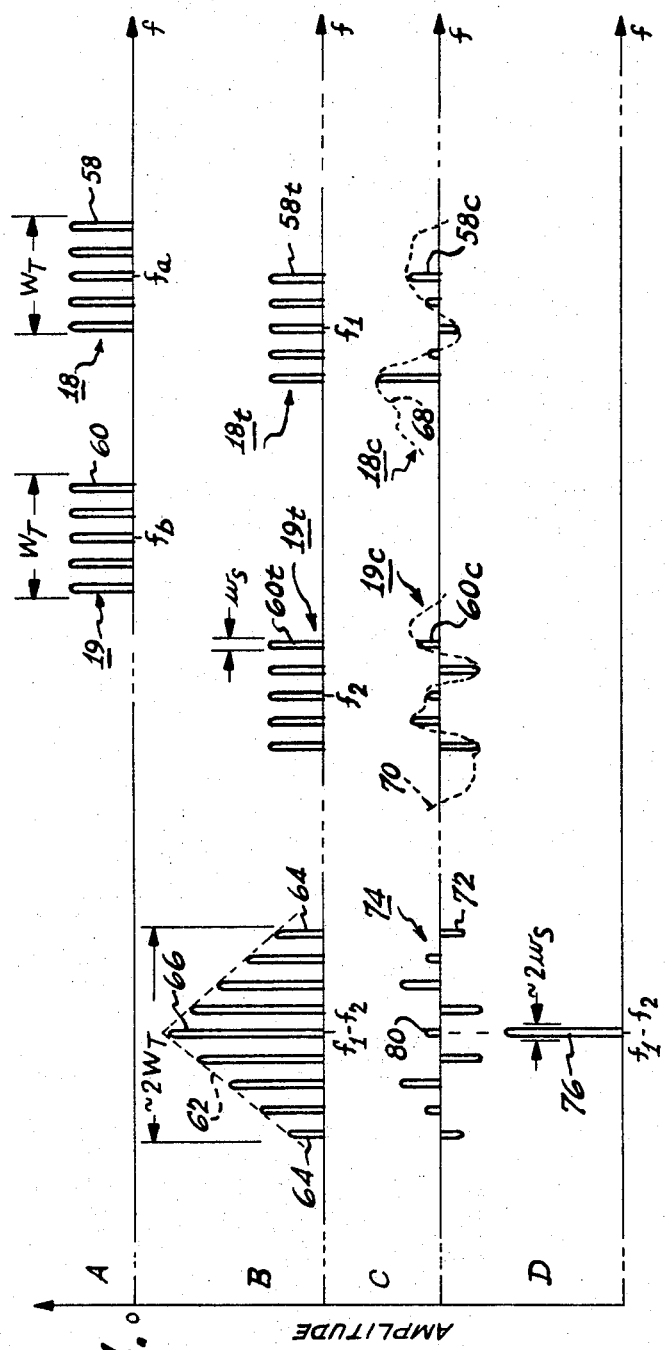
FIGURE 4 is an idealized graphical diagram of spectral characteristics of waveforms appearing in various parts of the system of FIG. 1, modified to transmit another form of signals, in which the spaced bands are each composed of uniformly spaced sub-bands.
Figure 6:
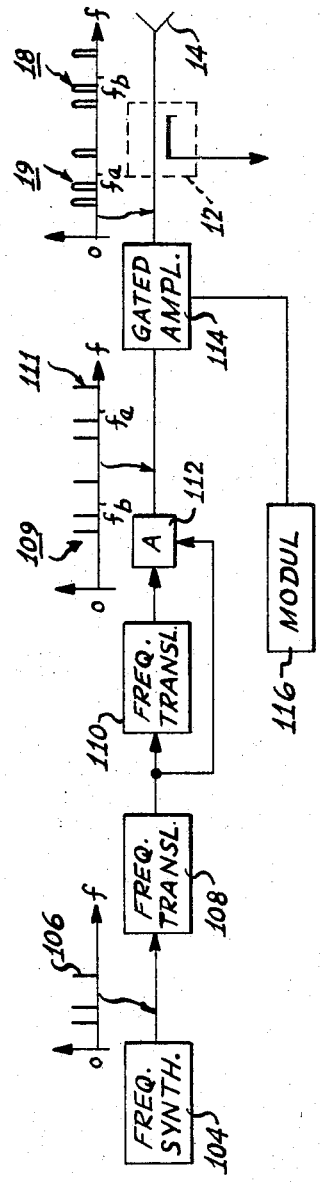
Figure 5:
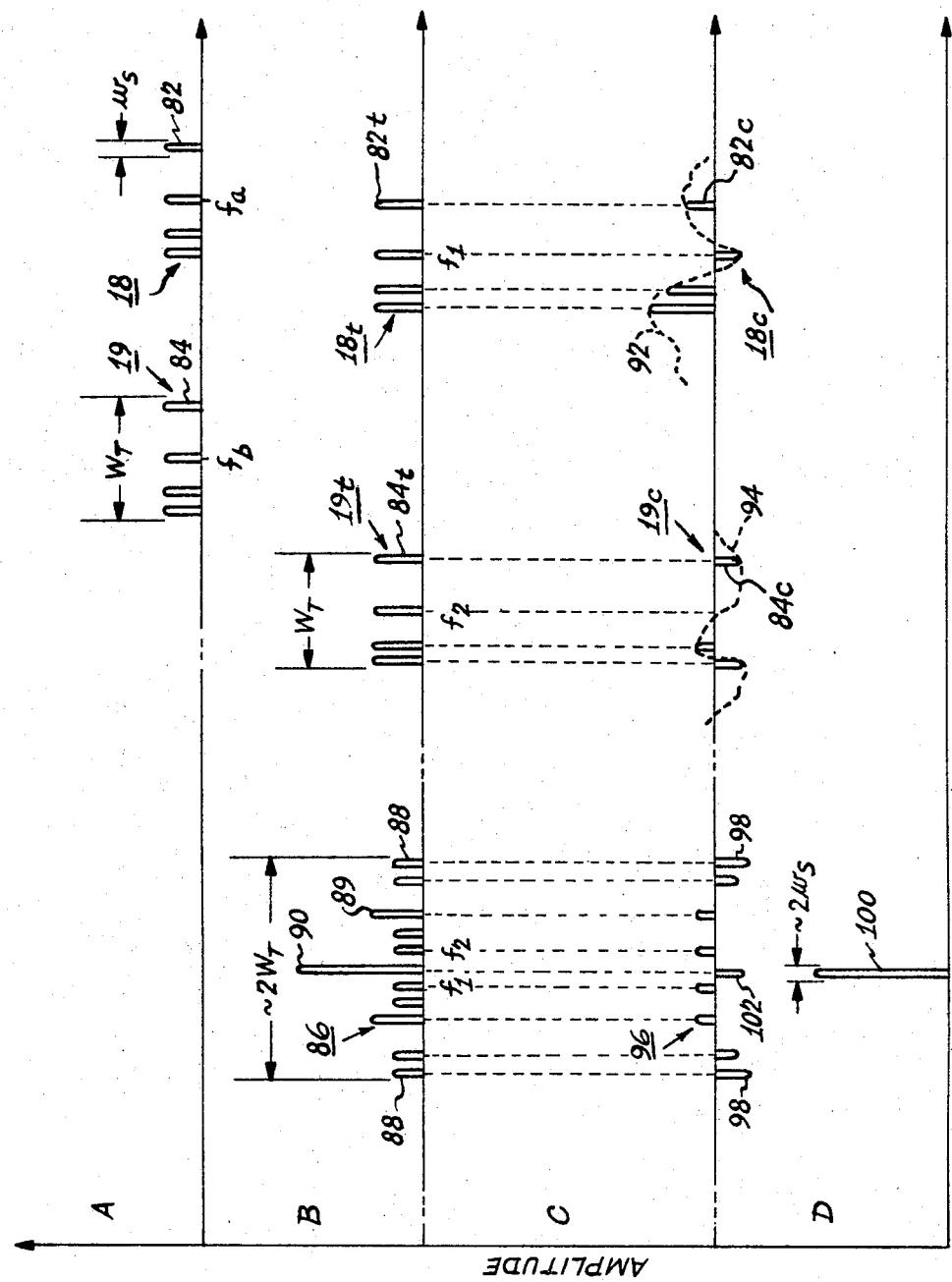

FIGURE 5 is an idealized graphical diagram of spectral characteristics of waveforms appearing in various parts of the system of FIG. 1, modified to transmit another form of signals, in which the spaced bands are each composed of non-uniformly spaced sub-bands; and FIGURE 6 is a schematic block diagram of another form of radar transmitter that is especially adapted for generating the transmitted signals of FIGS. 4 and 5.

In FIG. 1 a radar transmitter 10 is provided for transmitting, for example, via a conventional duplexer 12 and antenna 14, a radio wave to a target area 15. The wave is reflected back to the antenna 14, and the reflected signals have amplitude-phase modulations characteristic of the target area. The received signals are supplied, via the duplexer 12, to a radar receiver 16. The transmitted signals may take various forms, as discussed below, and generally are in the form of a plurality of spaced frequency bands of signals with such bands being substantially identical. One simple form of such transmitted signals is a train of similar pulses 17 modulated in time, and the spectrum of each time pulse 17 is made up of a pair of frequency bands 18 and 19 respectively centered about spaced frequencies $f_a$ and $f_b$. As described below, each band may be formed of a plurality of similar spaced sub-bands. The frequency bands 18 and 19 are illustrated in an idealized spectral diagram (FIG. 1) representing the spectrum or spectral envelope of each such transmitted time pulse 17.

The receiver 16 includes a pair of similar channels 20 and 22, which may contain suitable tuned circuits and other appropriate devices for handling the returned signals at the radio frequencies (R-F) $f_a$ and $f_b$. However, in view of processing operations that are to be performed, it is generally desirable to transform the R-F frequencies to suitable lower intermediate frequencies (I-F) by appropriate superheterodyning techniques, and the circuits of channels 20 and 22 are arranged to handle the corresponding I-F frequencies. For this purpose separate mixed circuits 24 and 26 are provided in each channel, and the received signals are beat with separate I-F oscillators 28 and 30, respectively, to reduce the received modulated R-F to similarly modulated I-F frequencies for the two channels 20 and 22, namely, to $f_1$ and $f_2$, respectively, without substantial change of the amplitude-phase relations of the signals. A master local oscillator 32 may be used in a conventional manner to control the synchronization of the individual oscillators 28 and 30. A single mixer and local oscillator may be provided common to both channels if desired; however, the separate oscillators 28 and 30 and associated mixers 24 and 26 have the advantage of permitting individual selection of the frequencies $f_1$ and $f_2$ and, thereby, of their relative spacing.

The channels 20 and 22 employ matched filters and other conventional circuitry for handling the particular signal modulation that is employed; channel 20 is tuned to $f_1$ to pass the band of returned signals about that frequency, and channel 22 is similarly tuned to $f_2$. The signals from the channels 20 and 22 are supplied to a signal correlation device that includes a correlation multiplier 34 which performs a time multiplication of these signals. The multiplier 34 may employ any suitable non-linear element or squaring device, and the output signals therefrom include product signals at the sum and difference frequencies. The correlation device also includes a selector 36 that passes the signals at the difference frequency, $F_1-f_2$, and it may take the form of a narrow band-pass filter. The passed signals are supplied to a detector 38, which has the form of a suitable non-linear element that converts the band of difference-frequency I-F signals to video signals and supplies them to a video processor 40 for obtaining the target range information in accordance with the range delay of the transmitted signals. Such range processing may be performed in any conventional manner, such as by comparing the time relation of the transmitted pulse to the received signals, and the connection 42 between the transmitter 10 and processor 40 indicates the conventional time synchronization that is employed in such processing.

Figure 2:
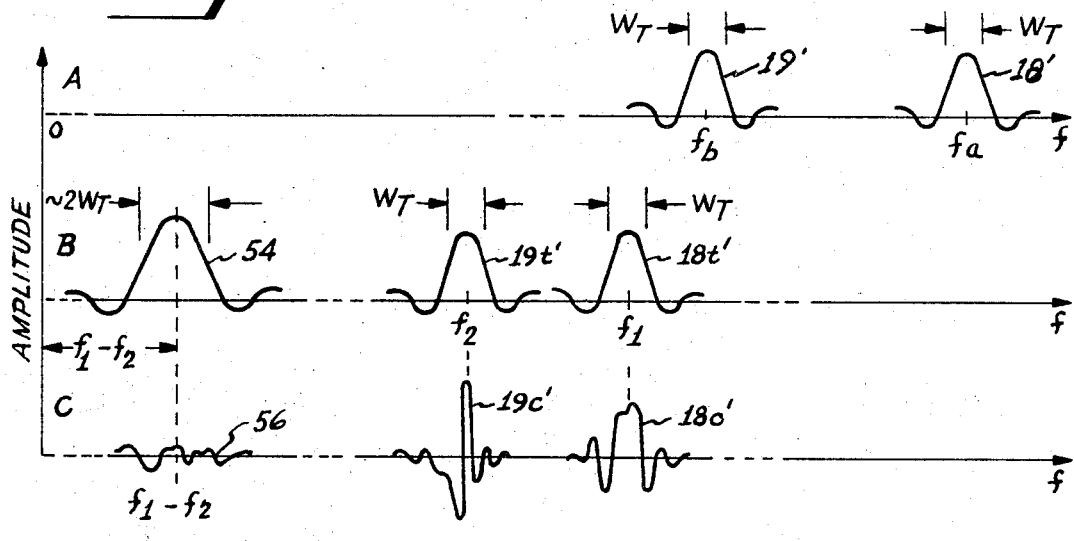
FIGURE 2 is an idealized graphical diagram of spectral characteristics of waveforms appearing in various parts of the system of FIG. 1.

The transmitter 10 may take various forms for generating signals of the required spectral characteristics. One simple form of such a transmitter includes two freely-running oscillators 44 and 46 that operate at $f_a$ and $f_b$, respectively. Their outputs are combined in an adder circuit 48 and supplied to a gated power amplifier 50, the output of which is fed to the antenna 14. The transmitter power amplifier 50 is keyed on and off by a train of rectangular time pulses (corresponding to pulses 17) generated by a modulator 52 (rectangular-pulse modulation is a common radar technique; however, this invention is not limited to any particular form of modulation). These modulator pulses may be periodic or aperiodic, as may be required in any particular radar system, and they also serve as the synchronizing signals on line 42. The rectangular-wave gating action modulates the single-frequency signals $f_a$ and $f_b$ to form signal bands having spectral characteristics such as those of bands 18' and 19' (FIG. 2A) centered at those frequencies. Thus, the spaced frequencies $f_a$ and $f_b$ from the oscillators 44 and 46 are combined and modulated to form a train of time pulses 17, each composed of spaced spectral bands 18 and 19.

In operation, each transmitted pulse 17 is made up of spaced frequency bands 18 and 19 of bandwidth $W_T$, respectively centered about radar frequencies $f_a$ and $f_b$. In practice, actual band spectra of each transmitted time pulse 17 are in the nature of waveforms 18' and 19' shown in FIG. 2A, rather than the flat spectra 18 and 19 illustrated for simplicity in FIG. 1. The reflected signals carry amplitude-phase variations in accordance with the transfer function of the reflecting medium at the target area. In the case of a point target, the transfer function H(f) may be considered as tending to have a generally flat characteristic (FIG. 3A) over the frequency range of the transmitted signal bands (or envelopes) 18, 19 (FIG. 3C) so that the reflected signal bands (or envelopes) 18t and 19t (FIG. 3D) supplied to the receiver 16 have generally the same spectral characteristics as those of the transmitted signal bands and their bandwidths about the transmitted frequencies $f_a$ and $f_b$ are also generally the same. Thus, in FIG. 2A, the spectral waveforms 18' and 19' generally represent the characteristics of the returned signals reflected from a point target as well as those of the transmitted signals. The superheterodyning at the mixers 24 and 26 scales down the frequencies of the returned signals to the I-F frequencies $f_1$ and $f_2$, and the spectral waveforms 18t' and 19t' (FIG. 2B) at the latter frequencies are substantially the same as the returned signals. The outputs of the channels 20 and 22, represented by waveforms 18t' and 19t' in the case of a point target, are supplied to the multiplier 34 where a time multiplication is performed. The multiplier 34 generally is a non-linear element (e.g., it may include an adder circuit and a squaring circuit). The channels 20 and 22 supply to the nonlinear element 34 signal outputs at various frequencies including those in the region of the difference frequency between those of the channels 20 and 22, the sum frequency, and in the video region. The product signals from the multiplier 34 are passed by the selector 36 and converted to video by the detector 38.

The multiplication of the two waveforms in real time corresponds to cross-correlation of the spectra of these two waveforms. Since the multiplication occurs in real time, the spectral cross-correlation likewise occurs in real time. Where the received signals are those reflected from a target (and not from clutter), the returned signal is substantially identical to the transmitted signal (except for range delay and Doppler shift), and the signals passing through the channels 20 and 22 are likewise unchanged except for conversion to intermediate frequencies. As a consequence, the spectral cross-correlation signal 54 appearing at the multiplier output is a spectral auto-correlation in that the correlated inputs are substantially identical, representing the condition of the signals being reflected from a point target. The auto-correlation spectrum 54 thus produced is a generally triangular spectral waveform that is symmetrical approximately about the difference frequency $f_1-f_2$, with a maximum approximately at that frequency, and a bandwidth of about twice that ($W_T$) of each band 42 or 44. This spectral waveform is a well known property of auto-correlation functions: It is generated by a convolution process that consists of concurrently multiplying the amplitude at each of one set of frequencies by the amplitude at each of another such set and algebraically summing the products. In a graphical sense, convolution is performed by sliding the spectral waveform 18t' along the $f$-axis to overlap the spectral waveform 19t'; at each stage, the amplitudes of the overlapping frequencies are multiplied and the products summed to produce the correlation amplitude of waveform 48 at the associated difference frequency. The peak amplitude occurs at full overlap of the similar waveforms 18t' and 19t' and its output frequency is the difference between the central frequencies $f_1$ and $f_2$ of the multiplied spectra.

When clutter is present, such as due to the sea, rain, or extended terrain, the returned radar signal is no longer the same as the transmitted signal; for example, a simple rectangular radar time pulse may be returned from clutter as a stretched pulse having amplitude-phase modulations that vary with the frequency of the transmitted signal. Thus the spectrum returned from the clutter tends to be different from the spectral return from the target, and the clutter spectrum tends to vary with the transmitted frequency, as may be explained by a radar partial coherence theory of clutter presented in my aforementioned article.

Figure 3:
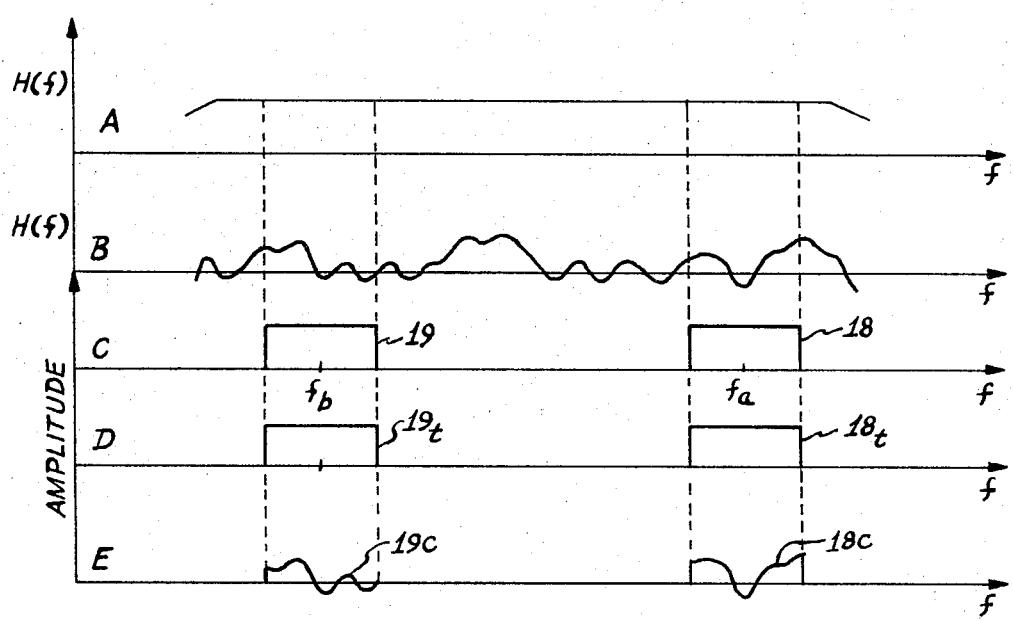
FIGURE 3 is an idealized graphical diagram of spectral characteristics of signals returned from different portions of a target area.

In contrast to the flat transfer function of a point target (FIG. 3A), the spectral transfer function H(f) of clutter may be quite irregular over the transmitted frequency range; the relative irregularity to be expected of a clutter transfer function is illustrated in FIG. 3B, which is presented only for purposes of explanation and is not intended as a representation of any particular form of clutter. Accordingly, the transmitted bands (or envelopes) 18 and 19 (FIG. 3C) would have their spectra modulated by those portions of the clutter transfer function that correspond in frequency, whereby the clutter-reflected bands (or envelopes) 18c and 19c (FIG. 3E) returned to the receiver would have amplitude-phase modulations representative of the sampled portions of the clutter spectrum. Thus, with a transmitted sampling pulse of spectra 18′ and 19′ (FIG. 2A), the returned pulse reflected from clutter may be expected to have, by way of a simplified example, irregular spectra of the type illustrated in the corresponding spaced bands 18c′ and 19c′ (which are scaled down to the I-F frequencies $f_1$ and $f_2$).

Spectrum 56 represents the multiplier output at the difference frequency $f_1-f_2$ where 18c′ and 19c′ are the multiplier inputs; its bandwidth is also about twice that of the transmitted bandwidth $W_T$. When the spectral return due to clutter is different in the high and low channels, as illustrated in the example of bands 18c′ and 19c′, the spectrum 56 of the multiplier output is substantially reduced in amplitude. The convolution process of the time multiplication is the same as that described above, except that the multiplier operates to produce the cross-correlation of substantially different signal spectra 18c′ and 19c′ in the two channels 20 and 22, respectively. The video output of detector 38 corresponds to the energy in the selected multiplier output signals, and is effectively represented by the area under the spectral waveforms 54 and 56, respectively, for the two cases of target and clutter. Hence the clutter output of the radar is substantially reduced as compared to the target output and the spectrum amplitude differences (at the difference frequency) and the corresponding video amplitudes provide a basis for discrimination between target and clutter. Real targets though not point targets generally tend to have regular transfer functions H(f), which may not be flat as that of FIG. 3A, but which tend to have only minor variations over the transmitted bandwidth compared to a clutter transfer function. Thus, real targets would reflect signals that should have substantial auto-correlation. Thus, a high signal response is provided for targets and a low response is generally provided for clutter, with the discrimination being based on the types of spectral returns in the two separated frequency bands. When the return is substantially similar in both bands, the spectral correlation is high, as would generally be the case for targets; dissimilar spectral returns are generally to be expected from clutter, and would produce low spectral correlation.

The spaced transmitted bands about frequencies $f_a$ and $f_b$ tend to give the advantage of wide band transmission. This transmitted bandwidth can be increased, as explained below, by various techniques employing additional pairs of signal bands at different frequencies. The signal output passed by the selector 36 is generally of narrow bandwidth, equal approximately to twice that of any one band, and is appropriate for radar information processing. The processor 40 includes suitable amplitude-discriminating circuitry for discriminating between the video signals developed from the auto-correlated signals returned from a target and the video signals developed from the cross-correlated signals returned from clutter.

The spectral diagram of FIG. 4 illustrates the operation of another form of this invention, in which the similar spaced frequency bands 18 and 19 from the transmitter 10 (FIG. 1) each represents an envelope of a plurality of substantially identical sub-bands 58 and 60 (FIG. 4A), respectively. The sub-bands are uniformly spaced in each of the bands 18 and 19 to maintain the similar character of these two spaced bands, which are respectively centered about R-F frequencies $f_a$ and $f_b$. The spectrum of each of the sub-bands 58 and 60 is shown in simplified form due to the compactness of the frequency scales of FIG. 4; these sub-bands each take a form similar to the band spectrum 18′ or 19′ of FIG. 2A; similarly, the other sub-bands in FIG. 4 have configurations similar to their counterparts in FIG. 2. The returned signals reflected from a target have corresponding band spectra 18t and 19t (which are illustrated in FIG. 4B, on a different frequency scale from that of FIG. 4A, as scaled down to I-F frequencies $f_1$ and $f_2$ in the channels 20 and 22). The spectra of their sub-bands 58t and 60t are generally of the same form as the spectra of the transmitted sub-bands 58 and 60, respectively, assuming that the target transfer function is substantially constant over the frequency range.

The operation of the channels 20 and 22 is generally similar to that described above for handling the bands 18t and 19t which are supplied to the correlation multiplier 34 for real-time multiplication. The spectral waveform of the output of multiplier 34 takes the form of a series of sub-band spectra 64, having a generally triangular, symmetrical envelope 62. The sub-bands 64 have a central sub-band 66 centered approximately at the difference frequency $f_1-f_2$. The bandwidth of the envelope 62 of the multiplier output is approximately twice that of each band 18t or 19t, and the product sub-bands 64 and 66 each has a bandwidth twice that of the returned-signal sub-bands 58t or 60t. Each of the sub-bands 64 or 66 has a general configuration similar to that of the correlation band 54 of FIG. 2B, and the side lobes of each of the sub-bands are not illustrated in FIG. 4 due to the small scale of the drawing.

In FIG. 4C, two broken-line sections 68 and 70 of an assumed irregular clutter transfer function H(f) are shown. The corresponding returned sub-bands 58c and 60c, as modulated by the clutter functions 68 and 70, have counterpart amplitude-phase relations. The sub-bands within the bands 18c and 19c of the returned clutter signals are substantially different, and corresponding sub-bands in the two bands 18c and 19c do not have correlated spectra. These bands 18c and 19c are cross-correlated by means of multiplier 34 in the manner described above, and the output of the latter, for the particular example illustrated in simplified, graphical form in FIG. 4C, is represented by the group 74 of sub-bands 72. The cross-correlated output 74 is substantially lower than the auto-correlated output 62 of the target waveforms of FIG. 4B, especially when compared with the peak sub-band 66 at the difference frequency $f_1-f_2$. The sub-bands 72 of cross-correlated group 74 (FIG. 4C) have a bandwidth corresponding to the sub-band 64 (twice that of sub-band 58c or 60c), and the overall bandwidth of group 74 is twice that of the band 19c or 18c.

The selector 36 is tuned approximately to the difference frequency with a narrow pass band approximately twice that of each of the transmitted or returned signal sub-bands 58 or 60, 58t or 60t. Thus the spectral output of selector 36 is a spectral waveform of relatively narrow bandwidth as illustrated in FIG. 4D. The selector output spectrum 76 is primarily determined by the central sub-band 66 of the auto-correlation spectra for a target; the contribution of the adjacent target sub-bands 64 and side lobes tends to be of a secondary character. The contributions of the latter would depend upon the effectiveness of the narrow-band selector 36. The amplitude of the selector output spectrum 76, due to a point target, is substantially greater than the corresponding output spectrum due to clutter, which would be primarily supplied by the central sub-band 80 of the cross-correlation spectra 74. Thereby, a high discrimination between target and clutter signals is provided, and voltage discrimination circuits normally provided at the input section of the video processor 40 would tend to provide high discrimination between the target and clutter video signals supplied by the detector 38.

A large number of sub-bands 58 and 60 may be provided in each of the spaced transmitted signal bands 18 and 19, to furnish as large a bandwidth in the latter's transmission as may be appropriate. This large transmission bandwidth tends to reduce the overall clutter effects in the returned signals (theory suggests that the reduction in clutter effects is due to the cross-correlation of the irregular modulation in the returned signals corresponding to the clutter function). The signal produced by such a system, represented by the waveforms of FIG. 4, is a narrow-band signal spectrum 76 (or 80), since the selector output has a bandwidth of approximately (but not greater than) twice that of the transmitted sub-band 58 or 60. The transmitted sub-bands can be chosen to be sufficiently narrow to ensure correspondingly narrow bandwidth for practical handling by the processor 40. Yet, by means of a plurality of sub-bands in each band 18 or 19, the advantages of wide band transmission for reduction of clutter effects is attained. Where the bands 18 and 19 are arranged to have a relatively wide bandwidth made up of a large number of sub-bands, the selector 36 supplies an output signal spectrum of narrow bandwidth that is but a small fraction of the transmitted bandwidth.

An alternative form of multi-frequency transmission is illustrated by the idealized spectral diagram of FIG. 5. Each of the spaced bands 18 and 19 (FIG. 5A) is composed of a plurality of sub-bands 82 and 84, respectively. The sub-bands 82 and 84 are generally identical in their characteristics, and each is centered about a different frequency within the frequencies of the associated band. Within each band 18 and 19, the associated sub-bands 82 and 84 are non-uniformly spaced, but the sub-bands in band 18 are spaced identically to those in band 19. From a target, the returned signal bands $18t$ and $19t$ (FIG. 5B, which has a different frequency scale from that of FIG. 5A) at the I-F frequencies $f_1$ and $f_2$, respectively, are similarly modulated by the relatively uniform target transfer characteristic for the transmitted frequency range. The spectra of the correlation multiplier output about the difference frequency $f_1-f_2$ for the assumed non-uniform spacing of transmitted signals 18 and 19, are represented graphically by the spectral band 86 composed of sub-bands or segments 88, 89 and 90. As described with respect to FIG. 4, the sub-bands 88, 89 and 90 each have approximately twice the bandwidth of the sub-bands $82t$ and $84t$, and the overall bandwidth of the multiplier output 86 about the difference frequency $f_1-f_2$ is twice the bandwidth of individual bands $18t$ and $19t$. For an assumed clutter transfer function, represented by the broken-line sections 92 and 94, the corresponding returned signals from such clutter (at the I-F frequency $f_1$ and $f_2$) are represented by the bands $18c$ and $19c$, which are respectively composed of the sub-bands $82c$ and $84c$ (for an assumed cross-over point of the clutter transfer function 94 at the frequency $f_2$, the corresponding clutter returned signal at that frequency has zero amplitude, which is represented in FIG. 5C by the absence of a spectral sub-band $84C$ at the corresponding I-F frequency $f_2$).

The cross-correlation output of the clutter returned signal bands $18c$ and $19c$ is represented graphically by the spectral band 96 formed of sub-bands or segments 98 and 102. The corresponding narrow-band selector output (having a bandwidth approximately equal to twice that of each of the transmitted or returned sub-bands 82, 84, $82t$ or $84t$) is represented by the spectral sub-bands 100 for the case of target reflected signal; it is represented by sub-band 102 for clutter reflected signals. The video output of detector 38 corresponds to the energy in the sub-band passed by the selector 36 (represented graphically by the area under the curve 90 or 102) which is very much greater for an auto-correlated target signal than for a cross-correlated clutter signal.

With the system represented by FIG. 5 of a multi-frequency transmission in each of the spaced bands 18 and 19, and with non-uniform spacing of the sub-bands, an improved auto-correlation output for target signals tends to be produced. That is, the multiplier output sub-band 90 at the difference frequency $f_1-f_2$ corresponds to the sum of the products of all of the corresponding sub-bands $82t$ and $84t$ in the spectral correlation stage of one set $82t$ fully overlapping the other $84t$. In the spectral convolution of the sub-bands $82t$ with the others $84t$, the multiplier output for any other convolution stage (i.e., for any other difference frequency on either side of $f_1-f_2$) corresponds (e.g., for sub-band 88) to a product of but one sub-band from each of the bands $18t$ and $19t$, or corresponds (e.g., for sub-band 89) to the sum of but two such products. However, the central, peak sub-band 90 represents the sum of all four products for the illustrative case of four transmitted sub-bands in each band shown in FIG. 5. Thus the multiplier output sub-band 90 at about the difference frequency $f_1-f_2$, where a non-uniform sub-band transmission is employed, corresponds to the sum of products of all of the sub-band inputs and tends to be substantially greater than the multiplier output spectrum at any of the adjacent frequencies.

The narrow pass-band selector 36 may pass contributions from correlation segments at frequencies adjacent to $f_1-f_2$. However, these contributions tend to be small in amplitude relative to that of the difference-frequency segment 90. Since the amplitude-phase spectra of the clutter tend to be variable both as to different types of clutter and within any clutter transfer function, it is to be expected that the amplitude-phase spectra of the sampled clutter within each of the spaced clutter-reflected bands $18c$ and $19c$ will be different; the amount of difference will depend upon the differences between the particular portions (e.g., portions 92 and 94) of the clutter transfer function that are sampled, and the particular scheme of non-uniformity of sub-band spacing that may be employed. In choosing a particular form of non-uniform spacing for the transmitted sub-bands 82 and 84, generally the more random the spacing between the sub-bands of each band, the better the characteristic of the auto-correlation output spectra 86 produced by target returned signals; that is, there tends to be substantial suppression of secondary maxima such as those of segments 89 (FIG. 5B), and for a purely random function but a single maximum segment 90 is produced with the remaining correlation segments being those of but a single product, such as the segment 88.

If the minimum frequency spacing of the transmitted sub-bands 82 and 84 (or 58 and 60 of FIG. 4) is chosen to be much greater than the reciprocal pulse width of time pulses 17, the selector 36 filters out the non-central frequency responses of the correlated output and passes a narrow-band wave form for processing. That is, exceedingly wide bandwidths (e.g., hundreds of megacycles) may be transmitted for the purposes of reducing clutter, and these wide bands are readily processed in the channels 20 and 22 and in the multiplier 34. However, the bandwidth for target information, which is the effective portion of the bandwidth (namely, the auto-correlated central sub-band 90, or 66 of FIG. 4), is approximately the reciprocal of the time-pulse length; thus, the target signals passed by the selector for video processing may be narrowband, of the order of megacycles, or less.

It should be noted that the clutter transfer-function sections 92, 94 (FIG. 5), as well as sections 68 and 70 (FIG. 4) and the transfer functions of FIGS. 3A and B, represent amplitude-phase frequency spectra and not the power spectra. The power spectrum of an expanse of clutter may be essentially flat, on the average, while its amplitude-phase spectrum may be quite irregular. The output of the square-law multiplier 34 is the cross-correlation of the amplitude-phase spectra of the returned signals, so that this output tends to be small where the amplitude-phase spectra are dissimilar in the spaced bands $18c$ and $19c$.

An additional advantage of the non-uniform spacing of side bands within each of the two transmitted bands 18 and 19 is produced in the transmitter operation. That is, where the side-band spacing is uniform, the frequencies in a common transmitter channel tend to interfere and to reinforce due to the regularity of the spaced frequencies. As a consequence, large voltage peaks may be produced which may saturate a transmitter linear amplifier and destroy the signal fidelity or, in a high-power transmitter device, it may cause voltage breakdown. This condition tends to be avoided by means of the non-uniform spacing of transmitter sub-bands described with respect to FIG. 5.

In FIG. 6, a suitable form of transmitter for multi-frequency transmission (uniform or non-uniform) is shown. A frequency synthesizer 104 is provided that produces a plurality of carrier-wave (C-W) frequencies 106 with the proportionate spacing desired in each of the transmitted band 18 or 19; these frequencies may be selected to be uniformly or non-uniformly spaced. Such synthesizers are well known and operate at relatively low frequencies. A frequency translator 108 transposes the C-W frequencies 106 to R-F frequencies to provide a corresponding low band of C-W frequencies 109 centered about $f_b$ at R-F frequency levels. A second frequency translator 110 receives the low band 109 of C-W frequencies centered about $f_b$ and translates them to a higher band 111 centered about $f_a$. These bands 109 and 111 from translators 108 and 110, respectively, are combined in an adder circuit 112 and supplied to a gated power amplifier 114, which is keyed on and off by a time pulse train from a modulator 116. The output of the gated amplifier 114 is a train of time pulses each of which is composed of two spaced signal bands 18 and 19 having their spectra respectively centered about $f_a$ and $f_b$ and each composed of substantially identical sub-bands respectively centered about the associated C-W frequency of bands 109 and 111. The signal bands 18 and 19 are transmitted via the duplexer 12 and antenna 14 in the manner described above. Other forms of transmitters may be employed; for example, a separate oscillator may be provided for each of the sub-bands to be transmitted (such as the oscillators 44 and 46 of FIG. 1), and all of the oscillator outputs are combined and modulated, in the manner described above, to produce a train of time pulses.

A useful form of frequency synthesizer 104 consists of a stable oscillator frequency modulated (FM) by a sine wave. The harmonics of the sine wave modulation produce equally spaced sub-bands similar to the sub-bands 58 and 60 (FIG. 4) in the bands 18 and 19 when pulse-gated at amplifier 114. Depending upon the FM modulation index, the sub-bands in 18 and 19 may have irregularities in amplitude and polarity (i.e., opposite phases). The effect obtained at the region of $f_1-f_2$ in the product signals from the correlation multiplier 34 is that of equally spaced sub-bands similar to the sub-bands 64, 66 (FIG. 4B) for a target, but with the secondary sub-bands reduced in amplitude and possibly of different polarities; the sub-band 66 at the difference frequency $f_1-f_2$ (which is produced at that difference-frequency correlation stage and represents the sum of the products of all of the corresponding sub-bands in returned signals 58t and 60t) remains large since the products of corresponding negative-polarity sub-bands are of positive polarity, as are those of positive-polarity sub-bands. Thus the parameter of the relative polarities of the transmitted signal sub-bands may be varied to obtain a relatively large correlation sub-band at $f_1-f_2$ and substantially smaller sub-bands at adjacent frequencies (similar to that achieved by variations in the spacing of the sub-bands as shown in FIG. 5). Other parameters of the transmitted signals may also be varied for this purpose. For example, the amplitudes of the sub-bands within each band may be varied, with corresponding sub-bands in each band being the same, in order to avoid any signal loss or degradation. In addition, combinations of variations in these parameters may be employed; for example, equally-spaced sub-bands in each band may have variations in polarity as well as in amplitude, and in addition all three parameters of the sub-bands in each band may be varied, with corresponding sub-bands being substantially the same in each band.

Equally spaced sub-bands may also be generated by the frequency synthesizer similarly to the sub-bands 58 and 60 of bands 18 and 19, with the exception that the sub-bands 58 and 60 in the bands 18 and 19 have the same irregular plus-minus polarity and for the irregular amplitudes. The equally spaced sub-bands similar to 62 in FIG. 2B for a target have reduced sub-bands 64; the sub-band 66 at frequency $f_1-f_2$ remains large.

This invention is not limited to a system in which the spaced bands 18 and 19 are transmitted concurrently. Each of these bands may be transmitted in a separate time pulse 17. For example, the lower frequency band 19 may be transmitted in a first time pulse 17, and the higher frequency band 18 in a second and following pulse 17. Channel 20 would be provided with a suitable delay line (e.g., of the recirculating type) of delay corresponding to that of the time delay from the first pulse to the second. Thereby, the spaced frequency bands of the returned signals are superimposed in time, and a concurrent time multiplication of the returned signals is produced which corresponds to the spectral correlation of their spectra 18t and 19t or 18c and 19c.

A sufficient amount of spacing between the transmitted bands 18 and 19 is generally chosen to ensure that the filters in channels 20 and 22 substantially isolate the returned bands so that different information segments in those bands are correlated (by the multiplication); to the extent that both channels carry information from the same band, a spurious output tends to be produced. Where the channels provide good isolation, the spacing can be correspondingly small, and at least in principle the bands 18 and 19 may be contiguous, and in fact may be partially overlapping in frequency. The reason is that the selection of the multiplier output is at the difference frequency $f_1-f_2$, so that essentially only the multiplication products at that frequency are utilized as outputs. Consequently, it is that difference frequency which determines and effectively defines the spacing between the bands. Thus, this invention may also be employed in a system having a continuous band transmission. The mixers 24 and 26 may be used to transform the continuous band into two segments for substantially separate handling by channels 20 and 22 and ultimate multiplication and correlation.

The multi-frequency feature of this invention is also applicable to the transmission of a plurality of similar frequency bands, each of which is composed of similar signals at a plurality of spaced single frequencies. One example is that of a laser radar transmitting individual frequencies arranged in bands in the manner described, so that the sub-bands assume the form of individual frequencies. The operation in other respects is generally the same as that described above.

Doppler-shift measurements may also be made concurrently with the ranging processing performed by processor 40. That is, the Doppler-shift information is contained in the output signals of channels 20 and 22, and these signals may be tapped off for performing the desired measurements in any appropriate manner. The Doppler-shift information in the returned signals is substantially cancelled out by the correlation process performed in the multiplier 34, but the target signals are identified by the video processor 40 and can be employed in performing the Doppler-shift measurements.

This invention may also be used to obtain basic information about clutter properties. For example, by appropriate choice of the transmitted bands, signals representative of any particular type of clutter can be obtained and the transfer function for that clutter developed.

Various modifications of this invention and other radar systems will be apparent to those skilled in the art from the foregoing description. This invention is not restricted to the use of any particular radar components for the transmitter 10 and receiver 16, and various types of suitable components are well known in the art. For example, the book, "Introduction to Radar Systems," by Skolnick, McGraw-Hill, 1962, describes and references various types of radar receivers and transmitters that may be employed. In chapter 8, "Receivers," sec. 8.12 at p. 357 et seq. describes and references suitable forms of superheterodyne receivers; sec. 9.2 at p. 409 et seq. describes and references suitable forms of matched-filter receivers (see especially IRE Trans., vol. 6, IT-6, No. 3, June 1960, which is a special issue devoted to matched filters). Suitable forms of matched filters for channels 20 and 22 will be readily apparent to those skilled in the art from the foregoing description. Where the multi-frequency techniques of this invention are employed, each channel 20 or 22 is composed of a plurality of matched filters or similar circuits that are individually tuned to accept the respective frequency sub-bands of the associated band 18$t$ or 19$t$ (which are at I-F frequencies where a superheterodyne receiver is employed). For the transmitter of FIG. 6, suitable forms of frequency synthesizers and frequency translators are well known in the art. See, for example, Microwave Journal, December 1964, circa p. 69, which describes a frequency standard synchronizer that may be employed as the synthesizer, and a harmonic generator that may be employed for the frequency translator; and the article in Microwave Journal, June 1966, at p. 97 et seq.

Thus, a new and improved radar signaling system is provided by means of this invention, in that clutter effects tend to be substantially reduced. In addition, this invention permits a large bandwidth to be transmitted, and furnishes information signals that have a narrow bandwidth suitable for processing. Various forms of radar transmitters may be employed, depending upon the choice of spaced signal bands to be transmitted. Similarly, various forms of receivers may be employed that permit the handling of the spaced frequency bands of returned signals and the multiplication of those bands.

The following mathematical presentation may be of assistance in understanding this invention. The nomenclature used is that employed in my aforementioned article.

A waveform, $u(t)$, is transmitted on two R-F carriers. Using complex signal representation, the transmitted signal is $$s_o(t) = s(t)e^{j2\pi f_0 t} \qquad (1)$$

where $$s(t) = u(t)e^{j2\pi f_3 t} + u(t)e^{-j2\pi f_3 t} \qquad (2)$$

Receiver processing is depicted in FIG. 1. The high and low frequency channels 20 and 22 are matched filters—matched respectively to the high and low frequency waveforms (or to corresponding translated I-F frequencies).

In the absence of clutter, the returned signal is given by Equation 1 with a Doppler shift, $\varphi$, to account for target motion. For the case where the frequency separation, $2f_3$, between the channels is greater than the channel bandwidth, the channel outputs are given by $$g_{u+}(t, \varphi) = e^{j2\pi f_3 t} g_u(t, \varphi) \qquad (3)$$

for the high frequency channel, and $$g_{u-}(t, \varphi) = e^{-j2\pi f_3 t} g_u(t, \varphi) \qquad (4)$$

for the low frequency channel, where $$g_u(t, \varphi) = e^{-j2\pi \varphi t} \chi_u(t, \varphi) \qquad (5)$$

is the channel matched filter output, and $$\chi_u(t, \varphi) = \int_{-\infty}^{\infty} u^*(z)u(z+t)e^{-j2\pi \varphi z}dz \qquad (6)$$

is the channel ambiguity function.

Since the channel output spectrum of (5) is $$G_u(f, \varphi) = U^*(f)U(f+\varphi) \qquad (7)$$

where $U(f)$ is the spectrum of $u(t)$, the high frequency channel output spectrum corresponding to (3) is given by $$G_{u+}(f, \varphi) = G_u(f-f_3) = U^*(f-f_3)U(f-f_3+\varphi) \qquad (8)$$

whereas the low-frequency channel output spectrum corresponding to (4) is seen to be $$G_{u-}(f, \varphi) = G_u(f+f_3) = U^*(f+f_3)U(f+f_3+\varphi) \qquad (9)$$

The channel outputs are applied to the nonlinear element 34 of FIG. 1, operating as a correlation multiplier. Since only those portions of the square-law output in the neighborhood of the channel difference frequency, $2f_3$, are retained through the selector filter 36 (tuned to $2f_3$), the pertinent square-law output may be written as $$p(t, \varphi) = g_{u+}(t, \varphi)g^*_{u-}(t, \varphi) = |\chi(t, \varphi)|^2 e^{j2\pi(2f_3)t} \qquad (10)$$

which has a spectrum $$P(f, \varphi) = \int_{-\infty}^{\infty} G^*_{u-}(z, \varphi)G_{u+}(z+f-2f_3)dz \qquad (11)$$

From (10), we note that the square-law output is the magnitude-squared ambiguity function of $u(t)$. From (11), we note that its spectrum is the cross-correlation (in the frequency domain) of the channel output spectra. Since the channel output spectra are identical except for a frequency shift, cf. (8), (9), the spectrum at the square-law output is the spectral autocorrelation function of (7) at the frequency, $2f_3$.

With clutter present, the clutter components at the outputs of channels 20 and 22 will be $g_{c+}(t, \varphi)$ and $g_{c-}(t, \varphi)$, which will generally be different for clutter resulting from large bodies; such as, sea, land, rain, etc. The correlation multiplier output 34 in the region of the channel difference frequency is given by $$p_c(t, \varphi) = g^*_{c-}(t, \varphi)g_{c+}(t, \varphi) \qquad (12)$$

which has a spectrum $$P_c(f, \varphi) = \int_{-\infty}^{\infty} G^*_{c-}(z, \varphi)G_{c+}(z+f-2f_3)dz \qquad (13)$$

where $G_{c-}(f, \varphi)$ and $G_{c+}(f, \varphi)$ are the different spectral returns due to clutter in the bands 18 and 19 of FIG. 4 or 5.

For clutter components, (13) shows that the correlation multiplier output is the spectral cross-correlation of the channel output spectra. When the channel output spectra are uncorrelated, or partially uncorrelated, the clutter passed by the selector 36 is reduced; cf. waveforms 80 and 102 of FIGS. 4 and 5, respectively.

What is claimed is:

1. A radar system comprising a radar transmitter and receiver, the improvement in such a system of: said radar transmitter including means for transmitting signals having at least two substantially similar and spaced frequency bands including means for transmitting a plurality of spaced frequency sub-bands in each of said similar spaced transmitted bands, with corresponding sub-bands in said bands having similar characteristics;

said radar receiver including means for receiving returned signals at about said spaced frequency bands and for separately handling signals over frequency bands corresponding to one and the other of said returned spaced frequency bands and having amplitude-phase variations corresponding to those of said returned signals, and means for instantaneously correlating the amplitude-phase relations of said received spaced frequency signals occurring at corresponding time periods including means for multiplying signals in said separately handled spaced frequency bands, and means for utilizing product signals at about a frequency corresponding to a combination of the frequencies of the multiplied signal bands.

2. A radar system as recited in claim 1 wherein said means for receiving and separately handling signals over spaced frequency bands includes a plurality of individual channels having transmission characteristics individually matched to the signals in said spaced bands.

3. A radar system as recited in claim 2 wherein said signal multiplying means includes a nonlinear device, and said utilizing means includes means for selecting a band of said product signals having a bandwidth that is less than that of said transmitted bands.

4. A radar system as recited in claim 3 wherein said combination of band frequencies is the difference thereof.

5. A radar system as recited in claim 4 wherein said utilizing means further includes detector means for converting said selected band of product signals to variable voltage signals and for discriminating between different voltage amplitudes thereof to discriminate between auto-correlated and cross-correlated ones of said product signals, whereby signals returned from a target are distinguished from those returned from clutter.

6. A radar system as recited in claim 5 wherein said utilizing means includes means for selecting a band of said product signals having a bandwidth that is approximately equal to twice that of said transmitted sub-bands.

7. A radar system as recited in claim 6 wherein the characteristic of said sub-bands in each of said spaced bands is non-uniform.

8. A radar system as recited in claim 7 wherein a characteristic spacing of said sub-bands is non-uniform in each band.

9. A radar system as recited in claim 7 wherein said transmitting means includes means for simultaneously transmitting said spaced bands.

10. A radar system comprising a radar receiver, an improvement in such a system of:
said radar receiver including means for receiving returned signals and for separately handling signals over a plurality of substantially similar frequency bands, with each of said bands including a plurality of spaced frequency sub-bands, and having amplitude-phase relations corresponding to those of said returned signals, means for instantaneously multiplying the signals of said sub-bands in said separately handled spaced frequency bands, means for selecting product signals at about a frequency corresponding to a combination of the band frequencies of the multiplied signals and having a bandwidth substantially less than that of each of said bands, and means for detecting the selected signals and for utilizing the detected signals for radar processing.

11. A radar system as recited in claim 10 wherein said selecting means includes means for selecting product signals having a bandwidth approximately equal to or less than twice that of each of said sub-bands.

12. A radar system as recited in claim 10 wherein said combination of frequencies is the difference thereof.

13. A radar system as recited in claim 12, and further comprising a radar transmitter for transmitting said similar frequency bands.

14. A radar system as recited in claim 13 wherein a characteristic of said sub-bands in each of said similar bands is non-uniform.

15. A radar system as recited in claim 14 wherein the characteristic phases of said sub-bands are non-uniform in each band.

16. A radar system as recited in claim 15 wherein the characteristic spacing of said sub-bands is non-uniform in each band.

17. A radar system as recited in claim 14 wherein the characteristics of the amplitudes of said sub-bands are non-uniform in each band.

References Cited
UNITED STATES PATENTS

| | | | |
|---|---|---|---|
| 3,249,940 | 5/1966 | Erickson | 343—17.1 |
| 3,302,161 | 1/1967 | Ellison | 340—3 |

RODNEY D. BENNETT, *Primary Examiner.*

J. G. BAXTER, *Assistant Examiner.*